(12) United States Patent
Hokao

(10) Patent No.: US 7,272,125 B2
(45) Date of Patent: Sep. 18, 2007

(54) CHANNEL SWITCHING METHOD AND MOBILE COMMUNICATION TERMINAL USING THE SAME

(75) Inventor: Tomoaki Hokao, Tokyo (JP)

(73) Assignee: NEC Corporation, Tokyo (JP)

( * ) Notice: Subject to any disclaimer, the term of this patent is extended or adjusted under 35 U.S.C. 154(b) by 978 days.

(21) Appl. No.: 10/303,886

(22) Filed: Nov. 26, 2002

(65) Prior Publication Data
US 2003/0153334 A1  Aug. 14, 2003

(30) Foreign Application Priority Data
Nov. 28, 2001  (JP) ............................. 2001-361857

(51) Int. Cl.
*H04B 7/216* (2006.01)
(52) U.S. Cl. ...................... 370/335; 370/350; 370/503; 370/331; 455/502; 455/442
(58) Field of Classification Search ................ 370/350, 370/335, 503, 331; 455/502, 442
See application file for complete search history.

(56) References Cited

U.S. PATENT DOCUMENTS 7,113,484 B1 * 9/2006 Chapman et al. ........... 370/252

FOREIGN PATENT DOCUMENTS

| EP | 0 526 436 | 6/1992 |
|---|---|---|
| GB | 2 281 177 | 7/1994 |
| GB | 3 327 013 | 6/1997 |
| JP | 7-184251 | 7/1995 |
| JP | 11-4211 | 1/1999 |
| JP | 11-69449 | 3/1999 |
| JP | 2000-4212 | 1/2000 |
| JP | 2000-244387 | 9/2000 |
| JP | 2001-8262 | 1/2001 |

OTHER PUBLICATIONS

Japanese Office Action issued Aug. 17, 2004 (w/ relevant English translation).

* cited by examiner

*Primary Examiner*—Duc M. Nguyen
*Assistant Examiner*—Aung T. Win
(74) *Attorney, Agent, or Firm*—Dickstein, Shapiro, LLP.

(57) ABSTRACT

A network station sends a switching instruction to a mobile unit. The mobile unit has two receiving sections and a transmitting section operable in two data formats. Upon receipt of the switching instruction, the first receiving section switches from a first data format to a second data format. The transmitting section sends an acknowledgment signal to the network. The first receiving section and transmitting section then attempt to switch to the second data format. The second receiving section remains in the first data format. The first receiving section then attempts to achieve synchronization. If synchronization is successful, a completion notice is sent back to the network station and the second receiving section is switched from the first data format to the second data format. If the synchronization is not successful, the second receiving section switches both the first receiving section and transmitting section back to the first data format and the first receiving section waits for a further switching instruction from the network.

22 Claims, 6 Drawing Sheets

TRAFIC DATA COMMUNICATION RATE: 32 Kbps
PHYSICAL BIT RATE (CONTAINING CONTROL SIGNAL):120 Kbps TRAFIC DATA COMMUNICATION RATE: 64 Kbps
PHYSICAL BIT RATE (CONTAINING CONTROL SIGNAL):240 Kbps

CHANNEL SWITCHING METHOD AND MOBILE COMMUNICATION TERMINAL USING THE SAME

BACKGROUND OF THE INVENTION

1. Field of the Invention

The present invention relates to a channel switching method and a CDMA communication system of a mobile communication terminal and a base station, using the same.

2. Description of the Related Art

In a mobile communication terminal of a CDMA (Code Division Multiple Access) type, there is a case that a physical data format is switched because of addition or removal of a service bearer, and change of a data communication rate or a spreading code or the like during a communication. Hereinafter, the switching is referred to as a channel switching. In such a case, the channel switching needs to be carried out at the same time by a network side such as a radio base station and a base station control station, and the mobile communication terminal.

FIGS. 1A and 1B show physical reception data formats before and after a traffic data communication rate is switched from 32 kbps to 64 kbps in a mobile communication terminal of a W-CDMA (Wideband Code Division Multiple Access) type, respectively.

Referring to FIGS. 1A and 1B, it is supposed that a data format before a rate switching is CH-A (a traffic data rate: 32 kbps, and a physical bit rate including a control signal: 120 kbps), and a data format after the rate switching is CH-B (a traffic data rate: 64 kbps, and a physical bit rate including a control signal: 240 kbps). Here, data is a traffic data, and TFCI (Transport Format Combination Indicator) and TPC (Transmit Power Control) are layer 1 control signals, and Pilot is a control signal used for determine establishment of synchronization with a base station (a known bit pattern: a pilot signal).

FIG. 2 shows a conventional channel switching sequence in the above-mentioned CDMA communication system. In FIG. 2, when a data format is switched from a data format (CH-A) to a different data format (CH-B) during communication using the data format (CHA) between the network side and the mobile communication terminal (MS: Mobile Station) (A1 of FIG. 2), a switching instruction from the data format (CHA) to the data format (CH-B) is firstly outputted from the network side to the mobile communication terminal (A2 of FIG. 2). At this time, a switching timing data is simultaneously outputted such that the switching operation is carried out at the same time in the network side and the mobile communication terminal.

The mobile communication terminal receives the switching instruction, and responds an acknowledgement (ACK) (A3 of FIG. 2). Then, the mobile communication terminal waits for the switching timing, and then carries out the switching operation from the data format (CH-A) to the data format (CH-B) (A5 of FIG. 2).

On the other hand, the network side confirms that the mobile communication terminal carries out the switching operation from the data format (CH-A) to the data format (CH-B), from reception of the acknowledgment (ACK). Then, the network side waits for the switching timing, and carries out the switching operation from the data format (CH-A) to the data format (CH-B) (A4 of FIG. 2).

After the switching to the data format (CH-B), the mobile communication terminal carries out a synchronization establishment determination of a reception signal, using the pilot signal of the data format (CH-B) and then notifies to the network side, the completion of the switching from the data format (CH-A) to the data format (CH-B) (A7, A8 of FIG. 2) at a time when the synchronization establishment is OK (normal) (A6 of FIG. 2).

In the above-mentioned conventional channel switching method, there may be a case of a failure of the channel switching operation, as shown in FIG. 3. At first, the network outputs the switching instruction to the mobile communication terminal to carry out the switching operation from the data format (CH-A) to the data format (CH-B) (B1, B2 of FIG. 3). At this time, the switching timing data is simultaneously outputted such that the switching operation is carried out at the same time in the network side and the mobile communication terminal.

The mobile communication terminal receives the switching instruction, and returns the acknowledgment (ACK) (B3 of FIG. 6). Then, the mobile communication terminal waits for the switching timing, and carries out the switching operation from the data format (CH-A) to the data format (CH-B) (B4 of FIG. 3).

Here, if the network side cannot receive the acknowledgment (ACK) from the mobile communication terminal for any reason, it is impossible to confirm that the mobile communication terminal carries out the switching operation from the data format (CH-A) to the data format (CH-B). Therefore, the network side does not carry out the switching operation from the data format (CH-A) to the data format (CH-B) even at the time of the arrival of the switching timing. In the mobile communication, there is a possibility that failure of signal reception frequently occurs because of fading, interference and the like in a radio interval.

On the other hand, the mobile communication terminal carries out the switching operation to the data format (CH-B), and then carries out the synchronization establishment determination of the reception signal using a pilot signal of the data format (CH-B). However, since the network side holds the data format (CH-A), the synchronization establishment is NG (abnormal) (B5 of FIG. 3).

After that, the network side uses a timer to output the switching instruction to the data format (CH-B) to the mobile communication terminal again (B6, B7 of FIG. 3). However, since having already switched to the data format (CH-B), the mobile communication terminal cannot receive the switching instruction. After all, the communication is disconnected (B8 of FIG. 3).

In conjunction with the above description, a spectrum spreading communications system is disclosed in Japanese Laid Open Patent Application (JP-A-Heisei 11-4211). In this conventional example, a carrier frequency is switched from a first frequency to a second frequency during communication with a first base station. After hand-over is carried out from the first base station to a second base station, a carrier frequency in communication with the second base station is switched from the second frequency to a third frequency. The second frequency is a frequency in the hand-over exclusive use.

Also, a CDMA mobile phone is disclosed in Japanese Laid Open Patent Application (JP-A-Heisei 11-69449). In the CDMA mobile phone of this conventional example, a transmission and reception section sends and receives a radio signal with a base station. A rake reception section receives a plurality of reception paths at a same time. A modulation and demodulation modulates a baseband signal to the radio signal and demodulates the radio signal in the baseband signal. A coding and decoding section encodes a communication signal and a control signal into the baseband signal and decodes the baseband signal into the communication signal and the control signal. A transmission unit and a sound coding section coverts a speech signal into the communication signal. A reception unit and a sound decoding section convert the communication signal into a speech signal. A control section controls an operation based on the control signal and sends necessary data to the base station as the control signal. The transmission and reception section receives signals sent out from the base station or a plurality of different base stations in two or more frequencies at a time, and transmits a signal to it or them.

Also, a channel estimating apparatus is disclosed in Japanese Laid Open Patent Application (JP-P2000-4212). In this conventional example, the channel estimating apparatus is composed of a first receiving section which receives a pilot signal on a first channel and a second receiving section which receives pilot signals on a second channel which are multiple-transmitted from a single antenna. The state of the channel is estimated from both of the received pilot signals.

Also, a synchronizing circuit is disclosed in Japanese Laid Open Patent Application (JP-P2000-244387). In the synchronizing circuit of this conventional example, diversity reception at a plurality of branches is carried out with a base station on communication. A correlation calculation is carried out to obtain correlation output for every branch, and the correlation outputs are combined. A signal from a base station as a switching destination is temporally stored, and the correlation calculation of the stored signal is carried out during a time period which the correlation calculation using any of the branches is not carried out, to establish synchronization with the switching destination.

Also, a base station is disclosed in Japanese Laid Open Patent Application (JP-P2001-8262). In this conventional example, a communication region covered by the base station is variable. The change of a spreading code is notified from a transmitting side to a receiving side between the base station and a mobile terminal using a channel, and after the notification, the spreading code is changed such that interference between the channel and another channel is reduced.

SUMMARY OF THE INVENTION

Therefore, an object of the present invention is to provide a channel switching method by which a success rate of a channel switching sequence can be improved, and a CDMA communication system of a mobile communication terminal and a base station, using the same.

Another object of the present invention is to provide a channel switching method by an error probability in a user data at a time of a channel switching can be reduced, and a CDMA communication system of a mobile communication terminal and a base station, using the same.

In an aspect of the present invention, a mobile communication terminal communicating with a network side, includes a radio section, first and second receiving section, a transmitting section, an integral synthesizing section, a processing section and a control section. The radio section receives a radio signal from the network side via an antenna to produce a reception data signal from the received radio signal, produce a transmission signal from a transmission data signal and transmits a radio signal corresponding to the transmission signal to the network side via the antenna. The first receiving section produces a first pilot symbol signal and a first data symbol signal from the reception data signal using a first channel parameter data as a current channel parameter data, and determines synchronization establishment from the first pilot symbol signal. The second receiving section produces a second pilot symbol signal and a second data symbol signal from the reception data signal using the first channel parameter data as a current channel parameter data, and determines synchronization establishment from the second pilot symbol signal. The transmitting section transmits the transmission data signal to the radio section using the first channel parameter data as a current channel parameter data. The integral synthesizing section selectively combines the first data symbol signal and the second data symbol signal to produce a reception data symbol signal. The processing section processes the reception data symbol signal, outputs the transmission data to the transmitting section, and outputs a channel switching signal from the first channel parameter data to a second channel parameter data when the reception data symbol signal contains the channel switching signal. The control section outputs an acknowledge as the transmission data to the processing section in response to the channel switching instruction such that the acknowledge is transmitted from the transmitting section, sets the second channel parameter data to the first receiving section and the transmitting section, and receives the determining result of the synchronization establishment in each of the first and second receiving sections.

Here, when it is determined in the first receiving section that the synchronization has been established after the first channel parameter data is set to the first receiving section, the control section sets the second channel parameter data to the second receiving section. In this case, the control section outputs a switching completion as the transmission data to the processing section in response to the completion of the setting of the second channel parameter to the second receiving section such that the switching completion is transmitted from the transmitting section.

Also, when it is determined in the first receiving section that the synchronization has been not established, and it is determined in the second receiving section that the synchronization has been established, after the first channel parameter data is set to the first receiving section, the control section sets the first channel parameter data to the first receiving section and the transmitting section. In this case, when the control section receives the channel switching instruction again, the control section which outputs said acknowledge as said transmission data to said processing section in response to said channel switching instruction such that said acknowledge is transmitted from said transmitting section, sets the second channel parameter data to the first receiving section and the transmitting section, and receives the determining result of the synchronization establishment in each of the first and second receiving sections.

Also, the first receiving section may include a plurality of finger sections, each of which produces a symbol rate reception data signal from the reception data signal at a chip rate using the current channel parameter data; a synthesizing section which synthesizes the symbol rate reception data signals to produce the first pilot symbol signal and the first data symbol signal and outputs the first data symbol signal to the integral synthesizing section, and outputs the first pilot symbol; and a synchronization determining section which determines the synchronization establishment from the first pilot symbol signal and outputs the determining result to the integral synthesizing section and the control section. Also, the second receiving section may include a plurality of finger sections, each of which produces a symbol rate reception data signal from the reception data signal at a chip rate using the current channel parameter data; a synthesizing section which synthesizes the symbol rate reception data signals to produce the second pilot symbol signal and the second data symbol signal and outputs the second data symbol signal to the integral synthesizing section, and outputs the second pilot symbol; and a synchronization determining section which determines the synchronization establishment from the second pilot symbol signal and outputs the determining result to the integral synthesizing section and the control section.

In another aspect of the present invention, a CDMA communication system, includes a base station and a mobile communication terminal. The mobile communication terminal may include a mobile communication terminal communicating with a network side, includes a radio section, first and second receiving section, a transmitting section, an integral synthesizing section, a processing section and a control section. The radio section receives a radio signal from the network side via an antenna to produce a reception data signal from the received radio signal, produce a transmission signal from a transmission data signal and transmits a radio signal corresponding to the transmission signal to the network side via the antenna. The first receiving section produces a first pilot symbol signal and a first data symbol signal from the reception data signal using a first channel parameter data as a current channel parameter data, and determines synchronization establishment from the first pilot symbol signal. The second receiving section produces a second pilot symbol signal and a second data symbol signal from the reception data signal using the first channel parameter data as a current channel parameter data, and determines synchronization establishment from the second pilot symbol signal. The transmitting section transmits the transmission data signal to the radio section using the first channel parameter data as a current channel parameter data. The integral synthesizing section selectively combines the first data symbol signal and the second data symbol signal to produce a reception data symbol signal. The processing section processes the reception data symbol signal, outputs said transmission data to said transmitting section, and outputs a channel switching signal from the first channel parameter data to a second channel parameter data when the reception data symbol signal contains the channel switching signal. The control section outputs an acknowledge as said transmission data to said processing section in response to said channel switching instruction such that said acknowledge is transmitted from said transmitting section, sets the second channel parameter data to the first receiving section and the transmitting section, and receives the determining result of the synchronization establishment in each of the first and second receiving sections.

Here, when it is determined in the first receiving section that the synchronization has been established after the first channel parameter data is set to the first receiving section, the control section sets the second channel parameter data to the second receiving section. In this case, the control section outputs a switching completion as said transmission data to said processing section in response to the completion of the setting of said second channel parameter to said second receiving section such that said switching completion is transmitted from said transmitting section.

Also, when it is determined in the first receiving section that the synchronization has been not established, and it is determined in the second receiving section that the synchronization has been established, after the first channel parameter data is set to the first receiving section, the control section sets the first channel parameter data to the first receiving section and the transmitting section. In this case, when the control section receives the channel switching instruction again, the control section outputs said acknowledge as said transmission data to said processing section in response to said channel switching instruction such that said acknowledge is transmitted from said transmitting section, sets the second channel parameter data to the first receiving section and the transmitting section, and receives the determining result of the synchronization establishment in each of the first and second receiving sections.

Also, the first receiving section may include a plurality of finger sections, each of which produces a symbol rate reception data signal from the reception data signal at a chip rate using the current channel parameter data; a synthesizing section which synthesizes the symbol rate reception data signals to produce the first pilot symbol signal and the first data symbol signal and outputs the first data symbol signal to the integral synthesizing section, and outputs the first pilot symbol; and a synchronization determining section which determines the synchronization establishment from the first pilot symbol signal and outputs the determining result to the integral synthesizing section and the control section. Also, the second receiving section may include a plurality of finger sections, each of which produces a symbol rate reception data signal from the reception data signal at a chip rate using the current channel parameter data; a synthesizing section which synthesizes the symbol rate reception data signals to produce the second pilot symbol signal and the second data symbol signal and outputs the second data symbol signal to the integral synthesizing section, and outputs the second pilot symbol; and a synchronization determining section which determines the synchronization establishment from the second pilot symbol signal and outputs the determining result to the integral synthesizing section and the control section.

Also, the base station may set the second channel parameter data when the acknowledge is received. Alternatively, the base station retransmits the channel switching instruction to the mobile communication terminal when the acknowledge is not received.

Also, the base station may communicate with the mobile communication terminal using the second channel parameter data when the switching completion signal is received.

In another aspect of the present invention, a channel switching method is achieved by (a) in a mobile communication terminal, replying an acknowledge from a transmitting section in response to reception of a channel switching instruction using a first channel parameter data, the channel switching instruction instructing a channel switching operation from the first channel parameter data to a second channel parameter data; by (b) in the mobile communication terminal, carrying out the channel switching operation from the first channel parameter data to the second channel parameter data in a first receiving section and the transmitting section; and by (c) in the mobile communication terminal, holding the first channel parameter data in a second receiving section.

In this case, the channel switching method may further include: (d) in the mobile communication terminal, checking synchronization establishment in the first receiving section and a second receiving section after the channel switching operation.

Also, the channel switching method may further include:

(e) in the mobile communication terminal, carrying out the channel switching operation from the first channel parameter data to the second channel parameter data in the second receiving section, when it is determined by the first receiving section that synchronization is established. In this case, the channel switching method may further include:

(f) transmitting a switching completion signal from the mobile communication terminal.

In this case, the channel switching method may further includes:

(g) in the mobile communication terminal, carrying out the channel switching operation from the second channel parameter data to the first channel parameter data in the first receiving section and the transmitting section, when it is determined by the first receiving section that synchronization is not established and it is determined by the second receiving section that synchronization is established.

Also, the channel switching method may further include:

(h) in a base station, carrying out the channel switching operation from the first channel parameter data to the second channel parameter data when the acknowledge is received.

Also, the channel switching method may further include:

(i) in a base station, re-transmitting the channel switching instruction to the mobile communication terminal, when the acknowledge is not received.

Also, the channel switching method may further include:

(j) communicating between a base station and the mobile communication terminal using the second channel parameter data.

DESCRIPTION OF THE PREFERRED EMBODIMENTS

Hereinafter, a CDMA communication system of a mobile communication terminal and a network side such as a base station and a base station control unit according to the present invention will be described with reference to the attached drawings.

Figure 1A:
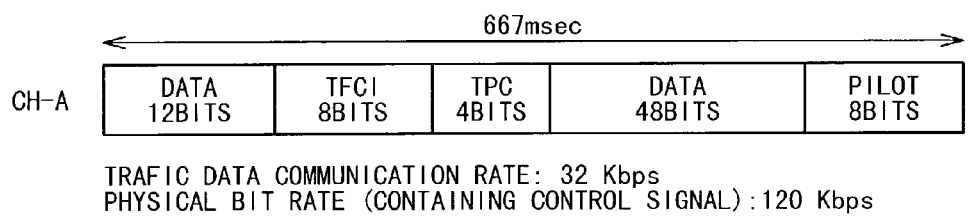
FIGS. 1A and 1B are diagrams showing data formats before and after a rate switching operation in a conventional example, respectively.
Figure 1B:
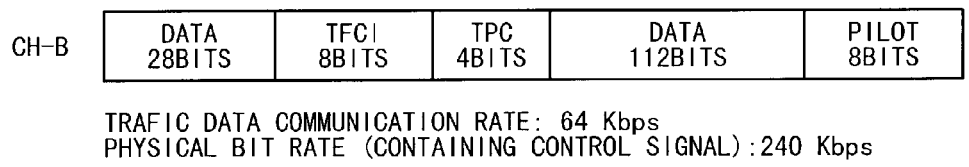
Figure 2:
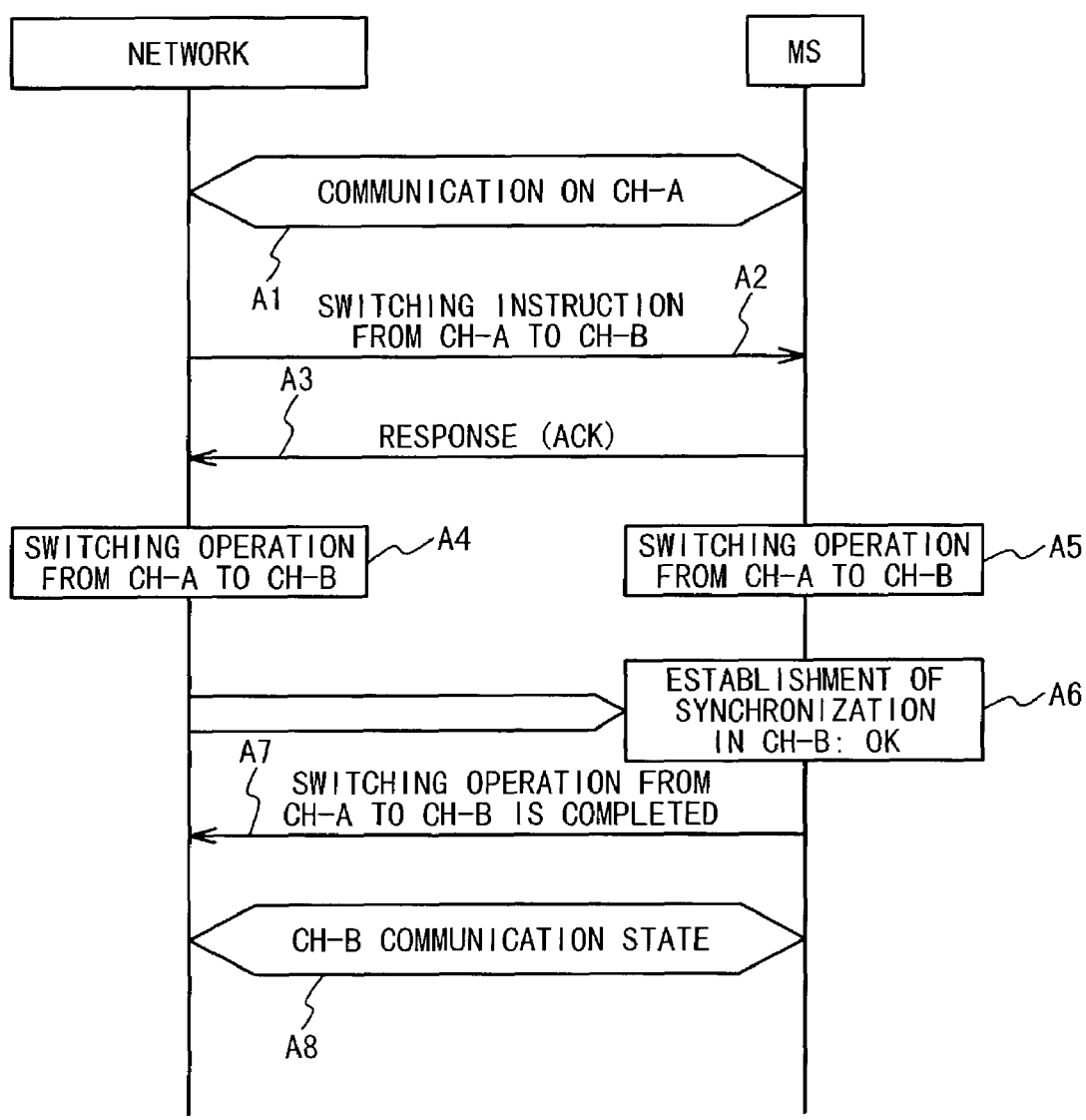
FIG. 2 is a sequence chart showing a channel switching operation in the conventional example.
Figure 3:
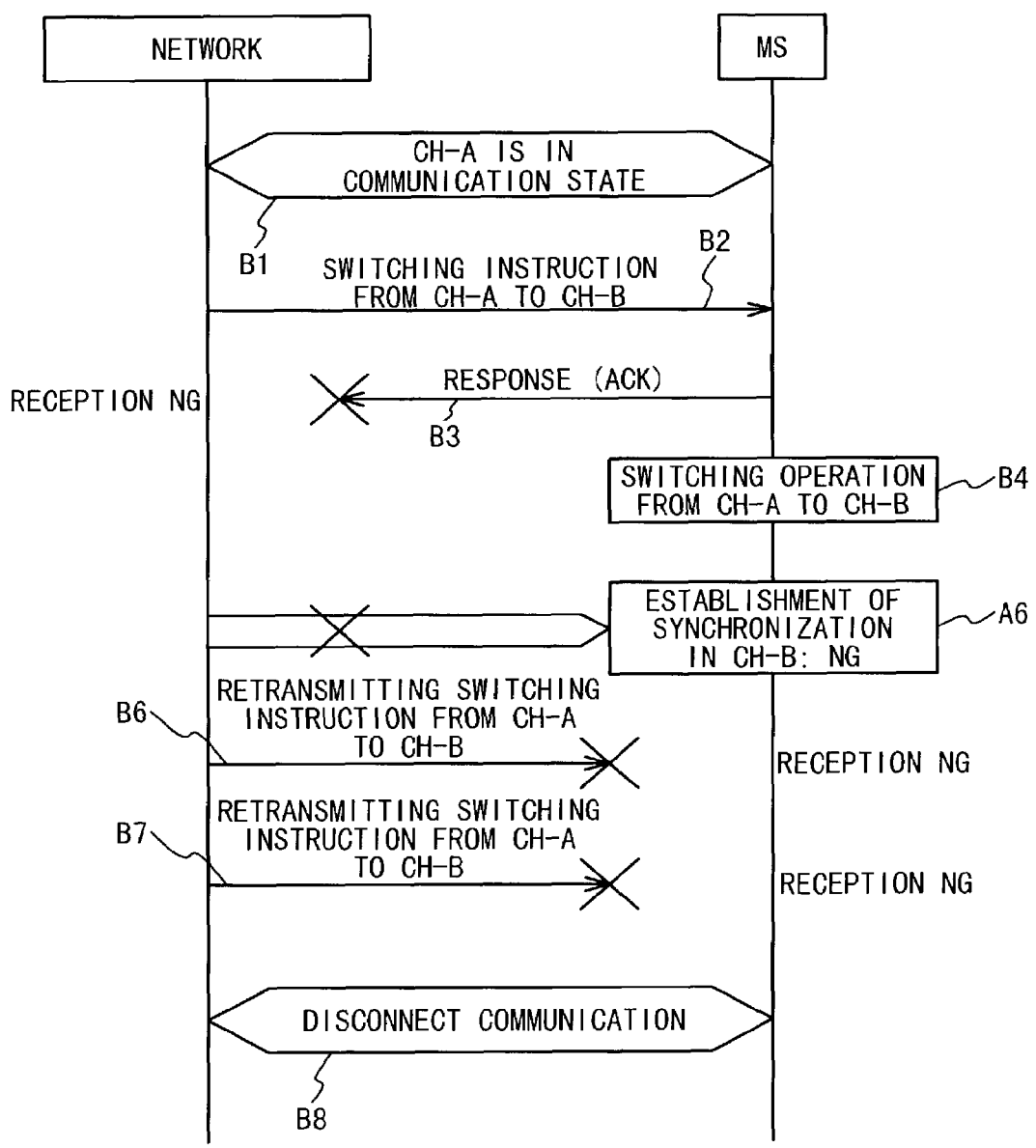
FIG. 3 is a sequence chart showing an operation when the channel switching operation is failed in the conventional example.
Figure 4:
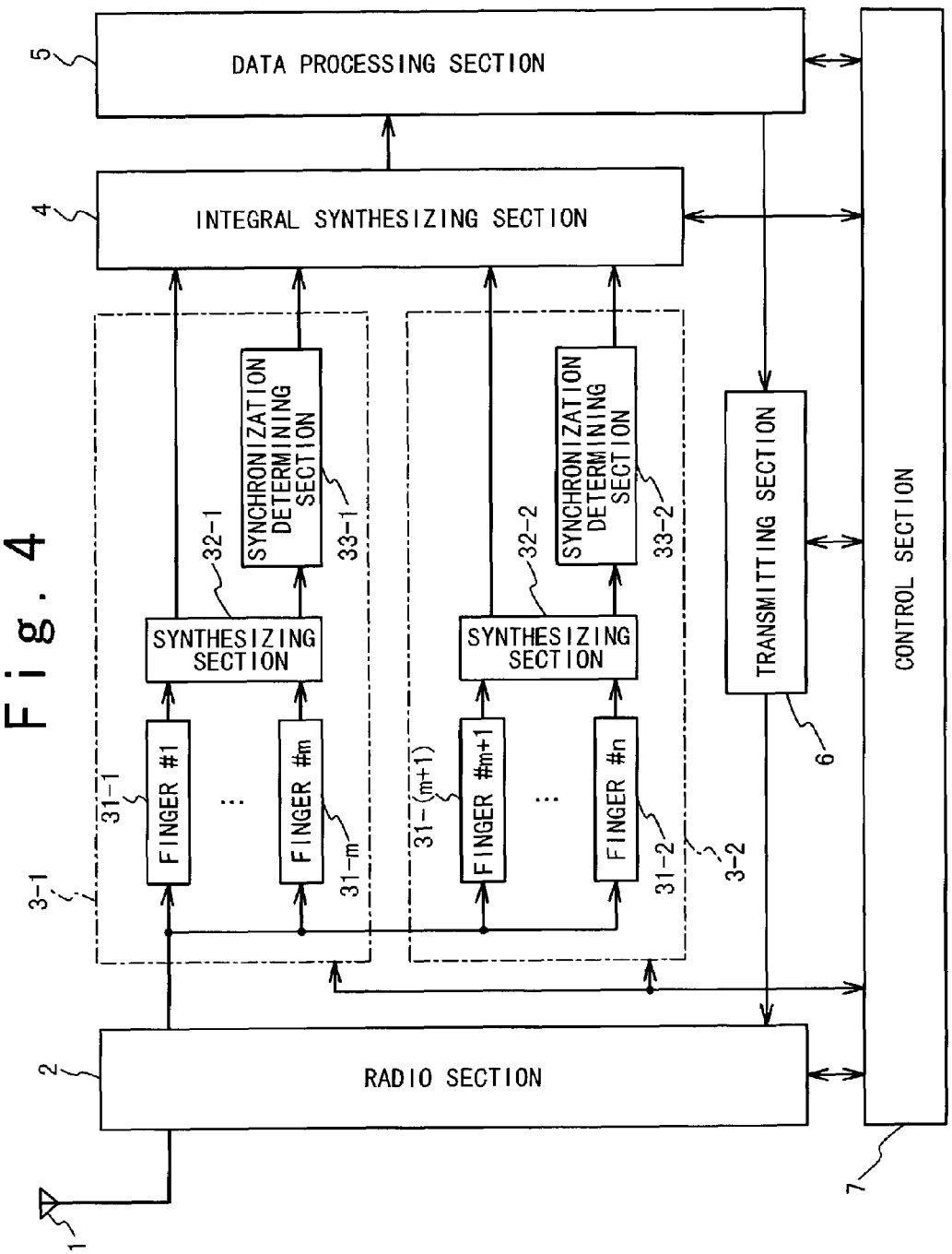
FIG. 4 is a block diagram showing the structure of a mobile communication terminal according to an embodiment of the present invention.

FIG. 4 is a block diagram showing the structure of a mobile communication terminal according to an embodiment of the present invention. Referring to FIG. 4, the mobile communication terminal according to the embodiment of the present invention is composed of an antenna 1, a radio section 2, a receiving section (#1) 3-1, a receiving section (#2) 3-2, an integral synthesizing section 4, a data processing section 5, a transmitting section 6 and a control section 7.

When receiving a radio signal from a radio base station (not shown) through the antenna 1, the radio section 2 carries out various operation such as a down conversion in frequency, an orthogonal demodulation of data, an A/D (Analog/Digital) conversion to the radio signal to produce a reception data signal at a chip rate. Then, the radio section 2 transfers the reception data signal to the receiving section (#1) 3-1 and the receiving section (#2) 3-2. Also, the radio section 2 carries out various operation such as a D/A (Digital/Analog) conversion, an orthogonal modulation of data, an up conversion of a frequency to a transmission data signal of the chip rate from the transmitting section 6, and then transmits as a radio signal to the radio base station.

The receiving section (#1) 3-1 is composed of one or more finger sections (#1 to #m) (1☐m) 31-1 to 31-m, a synthesizing section 32-1 and a synchronization determining section 33-1.

The control section 7 sets channel parameter data such as a despreading code and a symbol rate to the finger sections (#1 to #m) 31-1 to 31-m. Each of the finger sections (#1 to #m) 31-1 to 31-m carries out a despreading operation and a phase compensation to the reception data signal at the chip rate supplied from the radio section 2 using the channel parameter data, and generates a reception data signal at a symbol rate. Then, each finger section transfers the reception data signal at the symbol rate to the synthesizing section 32-1.

The control section 7 sets the channel parameter data about the data format of the reception data signal such as a symbol rate, the number of pilot symbols, the number of data symbols, and data of the finger sections to be combined to the synthesizing section 32-1. However, in the case of m=1, the synthesizing section 32-1 is not needed. The synthesizing section 32-1 synthesizes the reception data signals at the symbol rates supplied from the finger sections (#1 to #m) 31-1 to 31-m to produce a pilot symbol signal and a data symbol signal using the channel parameter data. Then, the synthesizing section 32-1 transfers the pilot symbol (known symbol) signal to the synchronization determining section 33-1, and transfers the data symbol signal to the integral synthesizing section 4.

The synchronization determining section 33-1 carries out the synchronization establishment determining operation by comparing the pilot symbol signal supplied from the synthesizing section 32-1 with a known symbol pattern, and notifies the comparing result to the integral synthesizing section 4 and the control section 7. For example, if there are erroneous pilot symbols of Np1 or more for Tp1 [sec], the synchronization determining section 33-1 determines that synchronization is NG (abnormal). Also, the synchronization determining section 33-1 determines that synchronization is OK (normal), otherwise. The control section 7 sets the channel parameter data to the synchronization determining section 33-1.

Also, the synchronization determining section 33-1 may carry out the synchronization establishment determining operation by using the pilot symbol signals supplied from the respective finger sections (#1 to #m) 31-1 to 31-m without using the pilot symbol signal supplied from the synthesizing section 32-1.

The receiving section (#2) 3-2 is composed of one or more finger sections (#m+1 to #n) (1☐m, m+1<n) 31-(m+1) to 31-n, a synthesizing section 32-2 and a synchronization determining section 33-2.

The control section 7 sets channel parameter data such as a despreading code and a symbol rate to the finger sections (#m+1 to #n) 31-(m+1) to 31-n. Each of the finger sections (#m+1 to #n) 31-(m+1) to 31-n carries out a despreading operation and a phase compensating operation to the reception data signal at the chip rate supplied from the radio section 2 using the channel parameter data, and generates a reception data signal at a symbol rate. Then, each finger section transfers the reception data signal at the symbol rate to the synthesizing section 32-1.

The control section 7 sets the channel parameter data about the data format of the reception data signal such as a symbol rate, the number of pilot symbols, the number of data symbols, and data of the finger sections to be combined to the synthesizing section 32-1. However, in the case of m=1, the synthesizing section 32-1 is not needed. The synthesizing section 32-2 synthesizes the reception data of the symbol rates supplied from the finger sections (#m+1 to #n) 31-(m+1) to 31-n to produce a pilot symbol signal and a data symbol signal using the channel parameter data. Then, the synthesizing section 32-1 transfers the pilot symbol (known symbol) signal to the synchronization determining section 33-2, and transfers the data symbol signal to the integral synthesizing section 4.

The synchronization determining section 33-2 carries out the synchronization establishment determining operation by comparing the pilot symbol signal supplied from the synthesizing section 32-2 with a known symbol pattern, and notifies the comparing result to the integral synthesizing section 4 and the control section 7. For example, if there are the erroneous pilot symbols of Np1 or more for Tp1 [sec], the synchronization determining section 33-2 determines to be the synchronization NG (abnormal). Also, the synchronization determining section 33-1 determines that synchronization is OK (normal), otherwise. The control section 7 sets the channel parameter data to the synchronization determining section 33-2.

Also, the synchronization determining section 33-1 may carry out the synchronization establishment determining operation by using the pilot symbol signals supplied from the respective finger sections (#m+1 to #n) 31-(m+1) to 31-n without using the pilot symbol signal from the synthesizing section 32-2.

The integral synthesizing section 4 synthesizes the reception data symbol signals from the synthesizing section 32-1 of the receiving section (#1) 3-1 and the synthesizing section 32-2 of the receiving section (#2) 3-2 to produce a synthesized data symbol signal, and transfers it to the data processing section 5. However, the synthesizing section 4 does not synthesize the reception data symbol signals from the receiving section (#1) 3-1 and the receiving section (#2) 3-2 if the result of the synchronization establishment determining operation from the synchronization determining section 33-1 or the synchronization determining section 33-2 is NG.

Also, there may be a case that the synthesizing section 4 selects the reception data symbol signal from any one of the receiving section (#1) 3-1 and the receiving section (#2) 3-2 without the synthesizing operation in accordance with an instruction from the control section 7 and transfers the selected signal to the data processing section 5. Also, there is a case that the synthesizing section 4 does not transfer any of them to the data processing section 5 in accordance with an instruction from the control section 7.

Also, the integral synthesizing section 4 has a function to measure a reception SIR (Signal to Interference power Ratio), and a function to control a transmission power through TPC (Transmit Power Control) and the like. However, they have no direct relation to the present invention. Thus, their descriptions are omitted.

The data processing section 5 processes the reception data symbol signal from the integral synthesizing section 4, and sends received control data (layer 3 message and the like) to the control section 7, and then sends transmission data to the transmitting section 6. In this case, the data processing section 5 receives control data (layer 3 message and the like) supplied from the control section 7, and carries out the process for transmitting and receiving user data (traffic data).

The transmitting section 6 carries out an error correction coding process to the transmission data from the data processing section 5, mapping and spreading processes to a physical channel and the like, and then transfers the results to the radio section 2 using the current channel parameter data which is set by the control section 7.

The control section 7 controls the above-mentioned respective blocks. That is, the control section 7 sets the channel parameter data containing any of the despreading code, the symbol code of the reception data, the number of pilot symbols, the number of user data symbols and the like, data of the finger sections to be combined, and a parameter for the synchronization establishment determination to the receiving section (#1) 3-1, the receiving section (#2) 3-2 and the radio section 6 in response to the switching instruction. Thus, the channel switching operation is carried out. Also, the control section 7 receives the result of the synchronization establishment determination from each of the receiving section (#1) 3-1 and the receiving section (#2) 3-2.

Also, the control section 7 can set whether the reception data symbol signals from the receiving section (#1) 3-1 and the receiving section (#2) 3-2 should be synthesized, any one of the reception data symbol signals should be selected or neither of them should be not selected, to the integral synthesizing section 4.

Moreover, the control section 7 controls the data processing section 5 to transmit and receive the control data (layer 3 message and the like), and sets the channel parameter data containing any of the spreading code, the symbol rate of the transmission data user, and an encoding parameter to the transmitting section 6.

Figure 5:
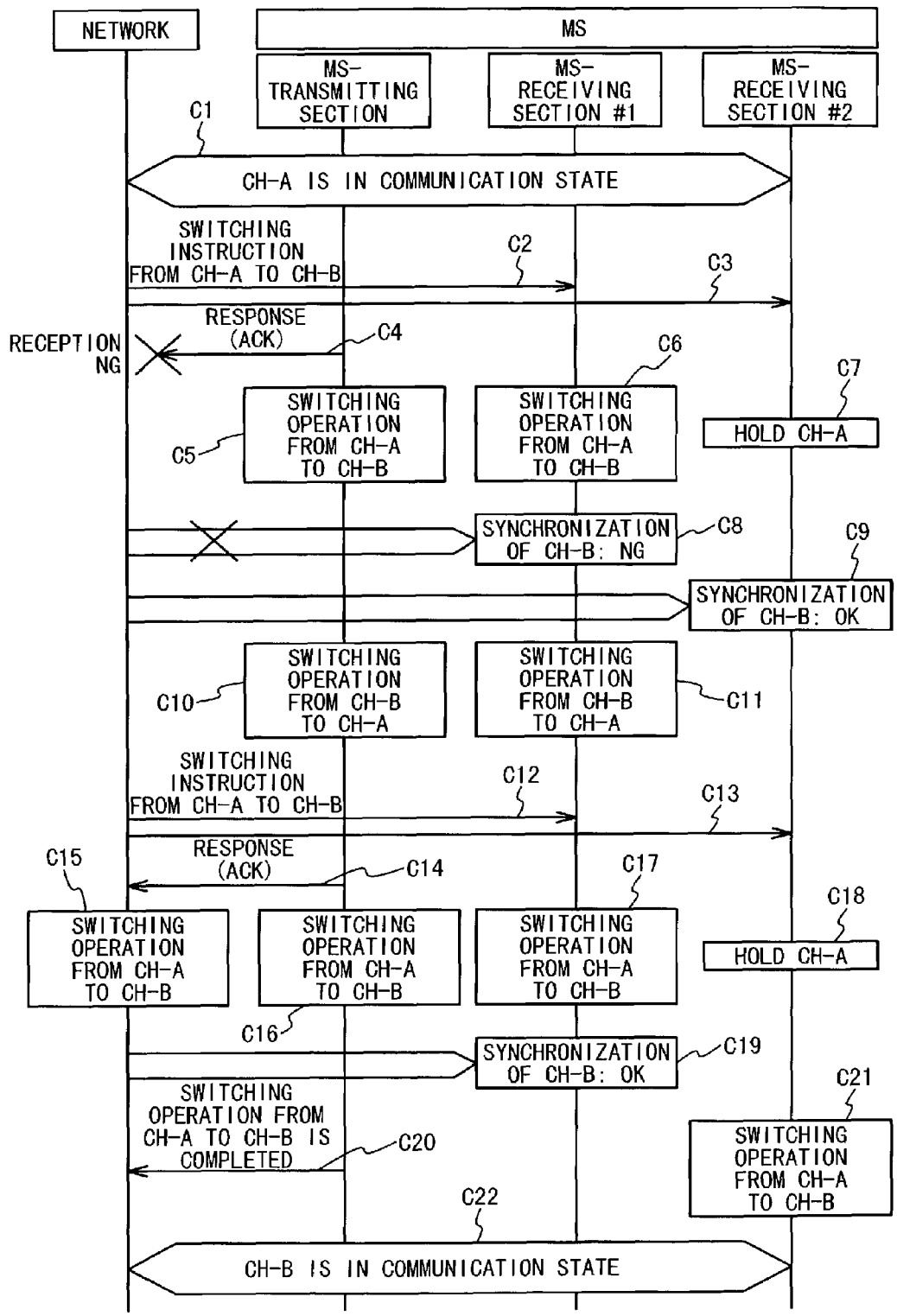
FIG. 5 is a sequence chart showing a channel switching operation according to the embodiment of the present invention.

FIG. 5 is a sequence chart showing the channel switching operation according to the embodiment of the present invention. The channel switching operation according to the embodiment of the present invention will be described below with reference to FIGS. 4 and 5.

At first, the network side such as a base station (not shown) and the mobile communication terminal communicate with each other using the data format (CH-A). In this situation, the network side issues the channel switching instruction from the data format (CH-A) to the data format (CH-B) to the mobile communication terminal (C1 to C3 of FIG. 5). At this time, the switching timing data is simultaneously outputted such that the switching operations are carried out at the same time in the network side and the mobile communication terminal. The channel switching instruction and the switching timing data are received through the radio section 2, the receiving sections 3-1 and 3-2, and the integral synthesizing section, and supplied from the data processing section 5 to the control section 7.

In the mobile communication terminal, the control section 7 controls the data processing section 5 to return the acknowledgment (ACK) in response to the channel switching instruction (C4 of FIG. 5). Then, the control section 7 waits for the switching timing based on the switching timing data and a timer (not shown). Thereafter, on the switching timing, the control section 7 sets the channel parameter data to the transmitting section 6 and the receiving section 3-1. Thus, the mobile communication terminal carries out the channel switching operation from the data format (CH-A) to the data format (CH-B) in the transmitting section 6 and the receiving section 3-1. However, the control section 7 does not set the channel parameter data to the receiving section 3-2 at the present time (C5, C6, C7 of FIG. 5). Therefore, the receiving section (#2) 3-2 is still held at the data format (CH-A).

Here, if the network side cannot receive the acknowledgment (ACK) because of any reason, for example, the fading, the interference or the like in the radio region, it is impossible to confirm that the mobile communication terminal carries out the channel switching operation from the data format (CH-A) to the data format (CH-B). Thus, the network side does not carry out the channel switching operation from the data format (CH-A) to the data format (CH-B) even at the time of the arrival of the switching timing.

After the channel switching operation to the data format (CH-B), the receiving section (#1) 3-1 of the mobile communication terminal carries out the determination of the synchronization establishment of a reception data signal uses the pilot signal of the data format (CH-B). Also, the receiving section (#2) 3-2 of the mobile communication terminal carries out the determination of the synchronization establishment of the reception data signal uses the pilot signal of the data format (CH-A). In this case, the network side is still at the data format (CH-A). Thus, the synchronization establishment determination result in the receiving section 3-1 is NG (C8 of FIG. 5). On the other hand, the synchronization establishment determination result in the receiving section 3-2 is OK (C9 of FIG. 5). When the synchronization establishment determination result of the receiving section (#1) 3-1 is NG, and the synchronization establishment determination result of the receiving section (#2) 3-2 is OK (C9 of FIG. 5), the channel switching operation in the mobile communication terminal is not carried out.

In this case, the control section 7 sets the channel parameter data for the data format (CH-A) to the receiving section 3-1 and the transmitting section 6. Thus, the channel switching operation is carried out from the data format (CH-B) to the data format (CH-A) again in the transmitting section 6 and the receiving section (#1) 3-1 of the mobile communication terminal (C10, C11 of FIG. 5). In this case, the control section 7 controls the integral synthesizing section 4 such that the reception data by the receiving section (#1) 3-1 is discarded when the synchronization establishment determination result is NG, and only the reception data by the receiving section (#2) 3-2 is processed when the synchronization establishment determination result is OK. Consequently, it is possible to continue the communication in a state in which the reception error is free, using the data format (CH-A).

After that, the network side uses a timer (not shown) to issue the channel switching instruction to the data format (CH-B) from the data format (CH-A) to the mobile communication terminal again (C12, C13 of FIG. 5). In the mobile communication terminal, the control section 7 receives the channel switching instruction again, and controls the data processing section 5 such that the acknowledge is returned to the network side. Then, the control section 7 waits for the switching timing after returning the acknowledgment (ACK), and sets the channel parameter data to the transmitting section 6 and the receiving section 3-1. Thus, the channel switching operation is carried out from the data format (CH-A) to the data format (CH-B), described above. However, the control section 7 does not set the channel parameter data to the receiving section 3-2 at the present time (C16, C17, C18 of FIG. 5).

On the other hand, since the network side receives the acknowledgment (ACK), the network side confirms that the mobile communication terminal carries out the channel switching operation from the data format (CH-A) to the data format (CH-B). Then, the network side waits for the switching timing, and carries out the switching operation from the data format (CH-A) to the data format (CH-B) (C15 of FIG. 5).

After the channel switching operation to the data format (CH-B), the receiving section (#1) 3-1 of the mobile communication terminal checks the synchronization establishment of the reception signal using the pilot signal of the data format (CH-B). At this time, the format of the network side is also switched to the data format (CH-B). Thus, the synchronization establishment determination result is OK in the receiving section (#1) 3-1 (C19 of FIG. 5).

When the control section 7 receives that the synchronization establishment determination result of the receiving section (#1) 3-1 is OK, the control section 7 controls the data processing section 5 such that the completion of the channel switching operation from the data format (CH-A) to the data format (CH-B) is notified to the network side (C20 of FIG. 5). At the same time, the control section 7 sets the channel parameter data to the receiving section (#2) 3-2 still held at the data format (CH-A). Thus, the channel switching operation is carried out from the data format (CH-A) to the data format (CH-B) in the receiving section (#2) 3-2 (C21 of FIG. 5). Thereafter, the communication is carried out using the data format (CH-B).

In this case, the reception data by the receiving section (#2) 3-2 is discarded because it is still held at the data format (CH-A). Therefore, only the reception data by the receiving section (#1) 3-1 is processed when the synchronization establishment determination result is OK. Thus, it is possible to continue the communication in which the reception error is free, using the data format (CH-B).

In order to attain the above-mentioned channel switching method, the mobile communication terminal needs to include the two receiving sections (the receiving section (#1) 3-1 and the receiving section (#2) 3-2). The CDMA mobile communication terminal generally includes a plurality of finger receiving sections in order to carry out the multi-transfer reception and the soft handover. Thus, the present invention can be attained using two finger receiving sections using the pilot signals. Each of the finger receiving sections carries out the usual operations (the multi-transfer reception, the soft handover and the like) at the time other than the channel switching operation.

Figure 6:
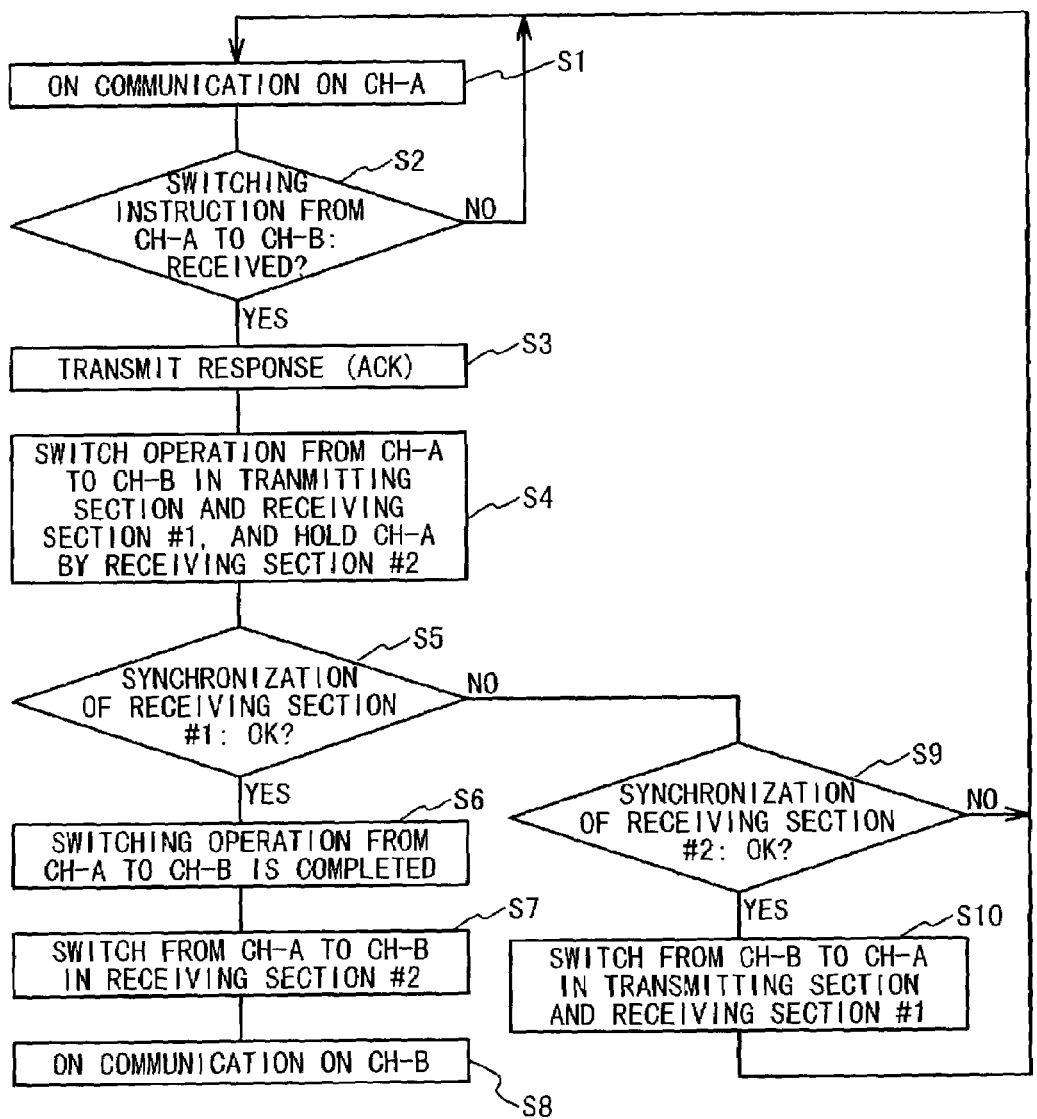
FIG. 6 is a flowchart showing an operation at a time of the channel switching operation according to the embodiment of the present invention.

FIG. 6 is a flowchart showing the operation at the time of the channel switching operation according to the embodiment of the present invention. The operation at the time of the channel switching operation according to the embodiment of the present invention will be described below with reference to FIGS. 4 and 6.

When the mobile communication terminal is communicating with the network side using a data format (CH-A) (Step S1 of FIG. 6), if the mobile communication terminal receives the channel switching instruction (layer 3 message) to a different data format (CH-B) from the network side (Step S2 of FIG. 6), the mobile communication terminal transmits to the network side the acknowledgment (ACK) corresponding to the channel switching instruction from the data format (CH-A) to the data format (CH-B) (Step S3 of FIG. 6). After that, in the mobile communication terminal, the transmitting section 6 and the receiving section (#1) 3-1 carry out the channel switching operation from the data format (CH-A) to the data format (CH-B), and the receiving section (#2) 3-2 holds the data format (CHA) (Step S4 of FIG. 6).

After that, if the synchronization establishment determination result is OK in the receiving section (#1) 3-1 (Step S5 of FIG. 6), the mobile communication terminal transmits to the network side a channel switching completion notice (the layer 3 message) from the data format (CH-A) to the data format (CH-B) (Step S6 of FIG. 6). In succession, the mobile communication terminal switches the receiving section (#2) 3-2 from the data format (CH-A) to the data format (CH-B) (Step S7 of FIG. 6), and communicates with the network side at the data format (CH-B) (Step S8 of FIG. 6).

On the other hand, when the synchronization establishment determination result is NG in the receiving section (#1) 3-1 (Step S5 of FIG. 6), if the synchronization establishment determination result is OK in the receiving section (#2) 3-2 (Step S9 of FIG. 6), the mobile communication terminal switches the transmitting section 6 and the receiving section (#1) 3-1 from the data format (CH-B) to the data format (CH-A). Then, the operation flow returns back to the step S1, and the mobile communication terminal waits for re-issuance of the switching instruction to the data format (CH-B).

Also, in the mobile communication terminal, if the synchronization establishment determination result is NG in the receiving section (#2) 3-2 (Step S9 of FIG. 6), the operation flow returns back to the step S1, and the mobile communication terminal waits for re-issuance of the switching instruction to the data format (CH-B).

As mentioned above, in this embodiment, the mobile communication terminal of the CDMA type is designed so as to include the two-system of the receiving section (#1) 32-1 and the receiving section (#2) 32-2, which includes one or more finger sections (#1 to #m) 31-1 to 31-$m$ and finger sections (#m+1 to #n) 31-(m+1) to 31-$n$, and the synchronization determining sections 33-1 and 33-2. At the time of the channel switching operation, the data reception and the synchronization establishment determination are carried out using the respective channel parameter data before and after the channel switching operation. Then, the network side determines whether or not the channel switching operation is carried out. Thus, the channel switching timings between the network side and the mobile communication terminal can be matched to each other.

In this way, in the mobile communication terminal of the CDMA type according to this embodiment, it is possible to improve the success rate of the channel switching sequence resulting from the addition or the removal of the service bearer during the communication, the change of the data communication rate, or the change of the spreading code or the like.

Also, in this embodiment, the mobile communication terminal of the CDMA type is designed so as to include the two-system of the receiving section (#1) 32-1 and the receiving section (#2) 32-2. At the time of the channel switching operation, the data reception and the synchronization determination are carried out in the respective channel parameter data before and after the channel switching operation. Then, the user data of the receiving section is discarded when the result of the synchronization establishment determination is NG, and only the user data of the receiving section is processed when the result of the synchronization establishment determination is OK. Thus, in the mobile communication terminal of the CDMA type, it is possible to reduce the error generation probability of the user data at the time of the channel switching.

As mentioned above, in the channel switching method of the present invention, at the time of the channel switching operation in the network side and the mobile communication terminal, when the channel switching operation is instructed by the network side, the synchronization determination and the data reception using the channel setting parameters before the channel switching operation are carried out simultaneously with the synchronization determination and the data reception using the channel setting parameters after the channel switching operation. Thus, it is possible to improve the success rate of the channel switching sequence. Thus, it is possible to obtain the effect that the success rate of the channel switching sequence can be improved.

Also, in another channel switching method of the present invention, the user data in which the result of the synchronization determination is abnormal is discarded, and only the user data in which the result of the synchronization determination is normal is processed. Thus, it is possible to obtain the effect that the error occurrence probability of the user data at the time of the channel switching can be reduced.

What is claimed is:

1. A mobile communication terminal communicating with a network side, comprising:

a radio section which receives a radio signal from said network side via an antenna to produce a reception data signal from the received radio signal, produce a transmission signal from a transmission data signal and transmits a radio signal corresponding to said transmission signal to said network side via said antenna;

a first receiving section which produces a first pilot symbol signal and a first data symbol signal from said reception data signal using a first channel parameter as a current channel parameter and determines synchronization establishment from said first pilot symbol signal;

a second receiving section which produces a second pilot symbol signal and a second data symbol signal from said reception data signal using said first channel parameter as a current channel parameter and determines synchronization establishment from said second pilot symbol signal;

a transmitting section which transmits said transmission data signal to said radio section based a transmission data using said first channel parameter as a current channel parameter;

an integral synthesizing section which selectively combines said first data symbol signal and said second data symbol signal to produce a reception data symbol signal;

a processing section which processes said reception data symbol signal, outputs said transmission data to said transmitting section, and outputs a channel switching instruction from said first channel parameter to a second channel parameter when said reception data symbol signal contains said channel switching instruction; and a control section which outputs an acknowledge as said transmission data to said processing section in response to said channel switching instruction such that said acknowledge is transmitted from said transmitting section, sets said second channel parameter to said first receiving section and said transmitting section, and receives said determining result of the synchronization establishment in each of said first and second receiving sections to determine the synchronization establishment.

2. The mobile communication terminal according to claim 1, wherein when it is determined in said first receiving section that the synchronization has been established after said first channel parameter is set to said first receiving section, said control section sets said second channel parameter to said second receiving section.

3. The mobile communication terminal according to claim 2, wherein said control section outputs a switching completion as said transmission data to said processing section in response to the completion of the setting of said second channel parameter to said second receiving section such that said switching completion is transmitted from said transmitting section.

4. The mobile communication terminal according to claim 1, wherein when it is determined in said first receiving section that the synchronization has been not established, and it is determined in said second receiving section that the synchronization has been established, after said first channel parameter is set to said first receiving section, said control section sets said first channel parameter to said first receiving section and said transmitting section.

5. The mobile communication terminal according to claim 4, wherein when said control section receives said channel switching instruction again, said control section which outputs said acknowledge as said transmission data to said processing section in response to said channel switching instruction such that said acknowledge is transmitted from said transmitting section, and then sets said second channel parameter to said first receiving section and said transmitting section, and receives said determining result of the synchronization establishment in each of said first and second receiving sections.

6. The mobile communication terminal according to claim 1, wherein said first receiving section comprises:
a plurality of finger sections, each of which produces a symbol rate reception data signal from said reception data signal at a chip rate using said current channel parameter;
a synthesizing section which synthesizes said symbol rate reception data signals to produce said first pilot symbol signal and said first data symbol signal and outputs said first data symbol signal to said integral synthesizing section, and outputs said first pilot symbol; and
a synchronization determining section which determines the synchronization establishment from said first pilot symbol signal and outputs the determining result to said integral synthesizing section and said control section, and said second receiving section comprises:
a plurality of finger sections, each of which produces a symbol rate reception data signal from said reception data signal at a chip rate using said current channel parameter;
a synthesizing section which synthesizes said symbol rate reception data signals to produce said second pilot symbol signal and said second data symbol signal and outputs said second data symbol signal to said integral synthesizing section, and outputs said second pilot symbol; and
a synchronization determining section which determines the synchronization establishment from said second pilot symbol signal and outputs the determining result to said integral synthesizing section and said control section.

7. A CDMA communication system, comprising:
a base station; and
a mobile communication terminal comprising:
a radio section which receives a radio signal from said base station via an antenna to produce a reception data signal from the received radio signal, produce a transmission signal from a transmission data signal and transmits a radio signal corresponding to said transmission signal to said base station via said antenna;
a first receiving section which produces a first pilot symbol signal and a first data symbol signal from said reception data signal using a first channel parameter as a current channel parameter and determines synchronization establishment from said first pilot symbol signal;
a second receiving section which produces a second pilot symbol signal and a second data symbol signal from said reception data signal using said first channel parameter as a current channel parameter and determines synchronization establishment from said second pilot symbol signal;
a transmitting section which transmits said transmission data signal to said radio section using said first channel parameter as a current channel parameter;
an integral synthesizing section which selectively combines said first data symbol signal and said second data symbol signal to produce a reception data symbol signal;
a processing section which processes said reception data symbol signal, outputs said transmission data to said transmitting section, and outputs a channel switching instruction from said first channel parameter to a second channel parameter when said reception data symbol signal contains said channel switching instruction; and
a control section which outputs an acknowledge as said transmission data to said processing section in response to said channel switching instruction such that said acknowledge is transmitted from said transmitting section, sets said second channel parameter to said first receiving section and said transmitting section, and receives said determining result of the synchronization establishment in each of said first and second receiving sections.

8. The CDMA communication system according to claim 7, wherein when it is determined in said first receiving section that the synchronization has been established after said first channel parameter is set to said first receiving section, said control section sets said second channel parameter to said second receiving section.

9. The CDMA communication system according to claim 7, wherein said control section outputs a switching completion as said transmission data to said processing section in response to the completion of the setting of said second channel parameter to said second receiving section such that said switching completion is transmitted from said transmitting section.

10. The CDMA communication system according to claim 7, wherein when it is determined in said first receiving section that the synchronization has been not established, and it is determined in said second receiving section that the synchronization has been established, after said first channel parameter is set to said first receiving section, said control section sets said first channel parameter to said first receiving section and said transmitting section.

11. The CDMA communication system according to claim 10, wherein when said control section receives said channel switching instruction again, said control section which outputs said acknowledge as said transmission data to said processing section in response to said channel switching instruction such that said acknowledge is transmitted from said transmitting section, sets said second channel parameter to said first receiving section and said transmitting section, and receives said determining result of the synchronization establishment in each of said first and second receiving sections.

12. The mobile communication terminal according to claim 7, wherein said first receiving section comprises:
   a plurality of finger sections, each of which produces a symbol rate reception data signal from said reception data signal at a chip rate using said current channel parameter;
   a synthesizing section which synthesizes said symbol rate reception data signals to produce said first pilot symbol signal and said first data symbol signal and outputs said first data symbol signal to said integral synthesizing section, and outputs said first pilot symbol;
   a synchronization determining section which determines the synchronization establishment from said first pilot symbol signal and outputs the determining result to said integral synthesizing section and said control section, and said second receiving section comprises:
   a plurality of finger sections, each of which produces a symbol rate reception data signal from said reception data signal at a chip rate using said current channel parameter;
   a synthesizing section which synthesizes said symbol rate reception data signals to produce said second pilot symbol signal and said second data symbol signal and outputs said second data symbol signal to said integral synthesizing section, and outputs said second pilot symbol;
   a synchronization determining section which determines the synchronization establishment from said second pilot symbol signal and outputs the determining result to said integral synthesizing section and said control section.

13. The CDMA communication system according to claim 7, wherein said base station sets said second channel parameter when said acknowledge is received.

14. The CDMA communication system according to claim 7, wherein said base station re-transmits said channel switching instruction to said mobile communication terminal when said acknowledge is not received.

15. The CDMA communication system according to claim 9, wherein said base station communicates with said mobile communication terminal using said second channel parameter when said switching completion signal is received.

16. A channel switching method comprising the steps of:
   (a) transmitting an acknowledge from a transmitting section of a mobile communication terminal in response to reception of a channel switching instruction from a network, said channel switching instruction instructing a channel switching operation from a first channel parameter to a second channel parameter;
   (b) carrying out said channel switching operation in said mobile communication terminal from said first channel parameter to said second channel parameter in a first receiving section and said transmitting section;
   (c) holding said first channel parameter in a second receiving section of said mobile communication terminal; and
   (d) checking synchronization establishment with said network in said first receiving section and said second receiving section, wherein a decision is made whether said channel switching has occurred in said network on the basis of a results of said synchronization establishment checks.

17. The channel switching method according to claim 16, further comprising the step of:
   (e) in said mobile communication terminal, carrying out said channel switching operation from said first channel parameter to said second channel parameter in said second receiving section, when it is determined by said first receiving section that synchronization is established.

18. The channel switching method according to claim 17, further comprising the step of:
   (f) transmitting a switching completion signal from said mobile communication terminal.

19. The channel switching method according to claim 16, further comprising the step of:
   (g) in said mobile communication terminal, carrying out said channel switching operation from said second channel parameter to said first channel parameter in said first receiving section and said transmitting section, when it is determined by said first receiving section that synchronization is not established and it is determined by said second receiving section that synchronization is established.

20. The channel switching method according to claim 16, further comprising the step of:
   (h) in a base station, carrying out the channel switching operation from said first channel parameter to said second channel parameter when said acknowledge is received.

21. The channel switching method according to claim 16, further comprising the step of:
   (i) in a base station, re-transmitting said channel switching instruction to said mobile communication terminal, when said acknowledge is not received.

22. The channel switching method according to claim 18, further comprising the step of:
   (j) communicating between a base station and said mobile communication terminal using said second channel parameter.

* * * * *